United States Patent Office 3,701,706
Patented Oct. 31, 1972

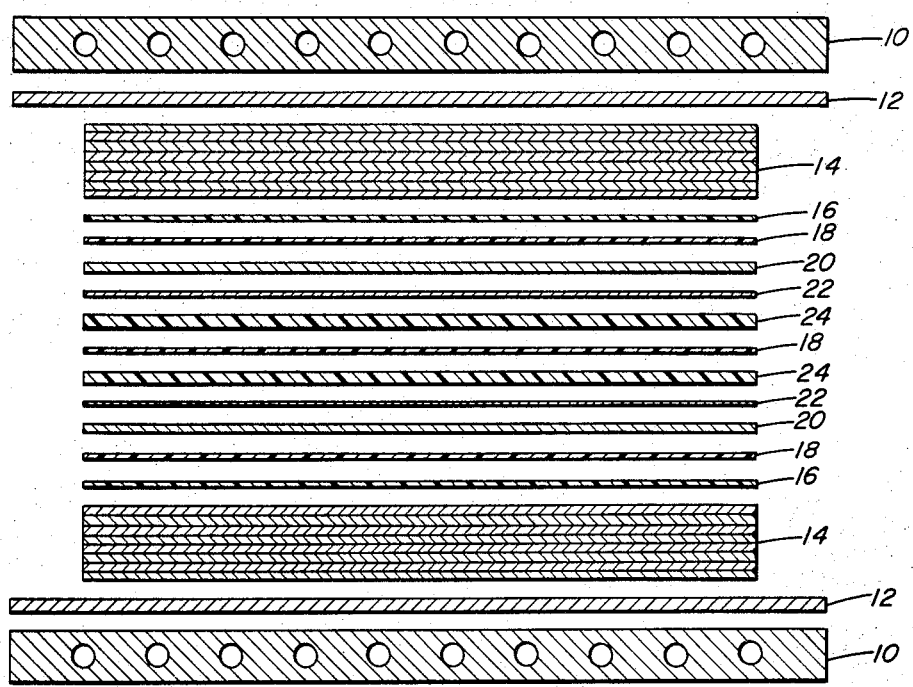

3,701,706
PROCESS FOR PREPARING A DECORATIVE LAMINATE IN WHICH A THERMOPLASTIC FILM IS USED TO ABSORB THERMAL SHOCK SHEAR STRESS
Sydney Arthur Giddings and Paul Nicholas Valerius, Cincinnati, Ohio, assignors to Formica Corporation, Cincinnati, Ohio
Filed Oct. 5, 1970, Ser. No. 77,794
Int. Cl. C09j 5/00
U.S. Cl. 156—306                10 Claims

ABSTRACT OF THE DISCLOSURE

A process for preparing a decorative laminate surfaced with a transparent thermoplastic film in which a removable film of polypropylene is utilized in order to absorb thermal shock and shear stress in the production of a high pressure laminate.

BACKGROUND OF THE INVENTION

Decorative laminates have been produced for a substantial plurality of years in preparing surface materials for the application to tables, vanitories, vertical wall coverings, door coverings, and the like. Ordinarily, these decorative laminates are prepared by assembling in superimposed relationship a plurality of kraft paper core sheets which have been impregnated with a thermosetting phenol-formaldehyde resin. Superimposed above these core sheets which may number between about 1 and 9 core sheets there is positioned a decorative sheet that is impregnated with a thermosetting resin which does not undergo any noticeable deterioration in color, such as darkening, upon any subsequently applied laminating conditions. Typical resins that meet this description are the melamine-formaldehyde resins, the epoxy resins, the unsaturated polyester resins, the urea resins, and the like. The decorative sheet may be a solid color α-cellulose paper sheet which has been dyed or pigmented to a selected color such as white, pink, yellow, and the like, or the decorative sheet may be a print sheet in which some design such as a geometric design or a floral design or a wood print is imparted to the decorative side of the decorative sheet before or after impregnation with the color stable thermosetting resin. Frequently, there is superimposed above the decorative sheet an overlay sheet which is a sheet of fine quality paper such as α-cellulose paper sheet unpigmented but again impregnated with a color stable thermosetting resin, which overlay sheet is superimposed above the decorative sheet, and then the entire assembly is heat and pressure consolidated under conventional conditions of pressure and temperature to produce a unitary laminated product. The overlay is used primarily when the decorative sheet is a print sheet so as to provide a barrier to avert abrasion of the printed part of the print sheet and thus preserve its printed characteristics intact for prolonged periods of time. Another recent development in the decorative laminate field is the texturing of the laminate by use of a texturing release sheet. More recently, a structure such as that described hereinabove has had the overlay either replaced or additionally surfaced with certain selected thermoplastic films such as films of poly(methyl methacrylate), blends of poly(methyl methacrylate) with polyvinylidene fluoride, polyvinyl fluoride, polyvinyl chloride and the like. Laminates of this composite type have many attractive features for use in building products and particularly in decorative surfacing products. The bridging of surface irregularities of substrates is an attractive feature of the thermosetting type of plastics while the continuous resin film properties of some thermoplastics give excellent moisture and weather resistance. Attempts to combine the two types of plastics have met with failure on the industrial scale, mainly because of the differences in the thermal expansion and thermal contraction with respect to dimensional change of the two types of material. The phenomenon of delamination because of thermal shock is most severe in the outside sheets of a press pack of the laminates. The degree of delamination decreases from the outside sheets towards the center of a press pack. Delamination is evident as blisters on the surface or complete separation of the thermoplastic surface from the rest of the laminate. The foregoing fault may be obvious upon inspection of the laminates after the pressing or consolidation under heat and pressure or faulty bonding may be determined by subsequent testing of a sample of the laminate by immersion in boiling water for a prescribed time.

In order to overcome this problem of delamination of the thermoplastic film from a thermoset laminate, we have found that by using a polypropylene film in back of the steel press plate which is contacting on its reverse side the thin transparent thermoplastic film that complete elimination of the delamination is obtained. This polypropylene film is used to absorb thermal shock and greatly reduce shear stress in the high pressure manufacture of decorative laminates. The polypropylene film may be between 5 and 25 mils thick and preferably 10 mils thick. If desired, a separator release sheet may be positioned between the polypropylene stress relief sheet and the stack of cushioned papers so as to prevent the polypropylene film from sticking to the top layer of the cushioned stack.

THE FIELD OF THE INVENTION

The concept of the present invention is in the field of making laminated plastic articles and more particularly decorative laminated plastic articles which are permanently surfaced with a transparent film of a thermoplastic material which thermoplastic layer or film becomes securely bonded to the decorative surface and is not subjected to delamination and blistering.

DESCRIPTION OF THE PRIOR ART

The instant applicants are aware of the U.S. Pat. 3,454,457 in which a Fabricated Caul Plate used in the pressure moulding of laminated plastic articles and carrying a releasing surface layer formed from a film of a synthetic resin such as polypropylene, but wherein the surface layer of the synthetic sheet material covers the face of the caul plate and conforms to the relief patent thereon.

SUMMARY OF THE INVENTION

This invention relates to a process for producing a decorative laminate comprising preparing an assembly of at least one core sheet impregnated with a thermosetting resin, a decorative sheet impregnated with a noble thermosetting resin, a thin transparent thermoplastic film positioned on said decorative sheet, in which there is placed on the decorative sheet side of the laminate assembly a steel press plate on to which is placed a removable 5 to 25 mil film of polypropylene as a stress relief sheet onto which is positioned a plurality of cushion sheets and the assembly is heat and pressure consolidated to a unitary structure. The thermoplastic transparent film used as the surface layer in the ultimate laminate may be any transparent, colorless or colored thermoplastic film containing no plasticizer or plasticized lightly with a non-migratory polymeric plasticizer, including such plasticizers as rubber polymers and copolymers. The essential feature of this thermoplastic film is to impart to the laminate surface a good stain and solvent resistance, but it is equally important that the thermoplastic transparent film be so securely bonded to that layer immediately below it in the laminate that it is not susceptible to delamination. Any film which contains a plasticizer which impairs this stain and solvent resistance is, therefore, not acceptable. Additionally, any thermoplastic film which is soluble in common solvents to any significant extent, such as alcohols, acetates, carbon tetrachloride and the like is undesirable. The thickness of the surface film is not critical but economics and commercial availability tend to dictate that the film be selected from those having a thickness between about 0.5 and 6 mils and preferably, between about 2 and 4 mils. Illustrative of the type of thermoplastic transparent films which may be used for the surface layer of the laminates of the present invention are polyvinyl chloride films, either plasticized lightly or unplasticized, films of polyacrylonitrile, films of nylon, films of chlorinated polyethers, films of polyesters, films of polycarbonates, films of poly(methylmethacrylate), films of blends of poly(methyl methacrylate) with polyvinylidene fluoride and films of Du Pont Surlyn A, a commercially available copolymer of ethylene copolymerized with a monomer containing carboxyl groups to provide an ionically reactive site. One of the preferred vinyl films which may be used to surface the laminate of the present invention is polyvinyl chloride which may be used as a homopolymer or as a copolymer prepared by copolymerizing vinyl chloride with minor amounts such as 15% or less of the acrylates such as methacrylates, ethacrylates, propyl acrylates, butyl acrylates, methyl methacrylate, ethyl methacrylate, methylethacrylate, ethylethacrylate, vinyl acetate, vinyl propionate, and the like. These surface films may contain, if desired, small quantities of stabilizers in an amount of 5% or less such as a commercially available epoxy, ester-metal salts, urethane extended epoxies and/or conventional plasticizers such as dibutyl phthalate, dioctyl phthalate, and the like. Additionally, one may use polyvinyl fluoride films and as a preferred embodiment, a film which is a homogeneous blend of polyvinyl fluoride containing uniformly dispersed therein from about 0.1% to about 10% by weight of a polymer derived from a polymerizable 2-hydroxybenzophenone.

The decorative pattern may be obtained either by printing directly in the surface film as described hereinabove, or by the use of a decorative sheet placed directly under the clear film. This decorative sheet is generally a fine grade of α-cellulose paper which has been impregnated with a noble resin. A noble resin is a resin which does not undergo any significant color deterioration during the consolidation step of manufacture of laminates. Among the noble resins which may be used to impregnate the decorative sheet are the melamine-formaldehyde resins, the epoxy resin, the unsaturated polyester resins, and the like. The expression "noble resin" has been utilized previously in issued patents such as the U.S. Pats. Nos. 3,373,068 and 3,418,189. The decorative sheet may be prepared from a fine quality α-cellulose paper which may have a basis weight of from about 45–123 pounds and preferably between about 60 and 70 pounds. One of the preferred noble resinous compositions which may be used to impregnate the decorative sheet are acrylic emulsions which is defined in greater detail hereinbelow. In order to achieve flexibility in the ultimate laminate, these acrylic emulsions are preferred. As a consequence, it is desired to make use of a resin blend comprising from 25–100% of the acrylic polymer solids in the emulsion and correspondingly from 75% to 0% by weight of a water-dispersible thermosetting melamine-formaldehyde resin. It is preferred that there be used between about 50% and 80%, by weight, of the acrylic polymer solids in the emulsion and, correspondingly, from about 50% to about 20% by weight, of the thermosetting water dispersible melamine-formaldehyde resin solids in the emulsion. The total solids in the emulsion, whether it be the acrylic polymer alone or the blend of the melamine-formaldehyde resin, may be in the range of about 25% to about 50%, by weight, of polymer and resin solids based on the total weight of the aqueous dispersion and, preferably, between about 30 and 40% solids, same basis. The decorative paper is impregnated with the acrylic emulsion or acrylic emulsion-melamine resin blend by passing a continuous web of the decorative paper through the treating bath by use of typical saturating techniques in order to provide a resin pick-up in the range of 30% to 50%, by weight, based on the total weight of the impregnated, dried paper and, preferably, from about 35 to 40%, by weight, of resin or polymer solids based on the total weight of the treated dried sheet. The thus treated web may then be dried in a conventional manner similar to the technique used to dry the base paper during which the resinous or polymeric components in the treated web is dried to a stable tackfree sheet. The acrylic emulsion used to impregnate the decorative sheet may be comprised of a homopolymer of a single acrylic monomer such as methyl methacrylate, ethyl methacrylate, ethyl acrylate, propyl acrylate, butyl acrylate, and the like, or the acrylic emulsion may be comprised of copolymers, terpolymers, and the like, of such acrylic monomers as those referred to hereinabove copolymerized with one another or with acrylic acid, methacrylic acid, ethacrylic acid, and the like. A substantial plurality of these acrylic emulsions are available commercially such as the Rohm and Haas Rhoplex B-15 which is particularly suitable for use in impregnating the decorative sheet.

The core sheet or sheets are impregnated with a thermosetting resin which may be a base resin that is one which will undergo significant deterioration in color during the heat and pressure step of the laminating operation or it may be a noble thermosetting resin if desired. One can use, for instance, any of the phenolic resins which are conventionally used to treat core sheets to be used in a laminate or one could use any of the noble resins cited hereinabove. In order to produce a fully flexible heat and pressure consolidated decorative laminate, one could use in the base sheet at least one dried dark paper-based sheet impregnated with from about 45% to about 75%, by weight, based on the total weight of the impregnated dried paper of a nitrile rubber composition containing from about 25% to 100% of nitrile rubber latex and correspondingly from about 75% to 0%, by weight, of a polyvinyl halide latex. The use of this nitrile rubber latex composition, especially when coupled with the use of the acrylic polymer emulsion wherein part significant flexibility to the ultimate laminate. This nitrile rubber latex composition may be used to impregnate the base sheet which is the lowest layer of the laminate and is sometimes referred to as the base member or core sheet and comprises at least one sheet of paper and preferably, unbleached kraft paper. Upon completion of the impregnation of the paper web which can be done continuously, the aqueous portion of the latex or emulsion is then flashed off by passing the impregnated wet web to a heating chamber or oven or it may be passed through a plurality of heated rolls whereby the temperature is sufficient to evaporate the water from the web thereby leaving the nitrile rubber present on the dried web. The dried web thus produced is ready to be cut into the desired sizes and positioned in the assembly preparatory to making the laminate. The nitrile rubbers may be acquired from a pluraltiy of commercially available sources and are copolymers of either acrylonitrile and/or methacrylonitrile with a copolymerizable rubber latex forming monomer such as one or more of the butadienes. If desired, one may use a terpolymer of the type of rubber latex which is prepared by interpolymerizing acrylonitrile and/or methacrylonitrile with one or more of the butadienes and one or more of the polymerizable styrenes such as styrene per se or the ring-substituted alkyl styrenes such as o-, m-, p-methyl styrene and/or the ring-substituted halo styrenes such as the chloro and bromo ring-substituted styrenes, and the like. It is preferred to make use of a nitrile rubber latex which is prepared by copolymerizing butadiene and acrylonitrile in a conventional latex or emulsion polymerization technique in which the copolymer contains between about 20 and 50 parts, by weight, of acrylonitrile and, correspondingly, between 80 and 50 parts of butadiene and, preferably, between about 25 and 35 parts, by weight, of acrylonitrile and, correspondingly, from about 75 to about 65 parts, by weight, of butadiene. As used, the nitrile rubber latex in the aqueous dispersion may contain between about 35% and 55%, by weight, of solids based on the total weight of the latex and, preferably, between about 45% and 50%, by weight, solids, same basis. As a further preferred embodiment, one may blend with the nitrile rubber latex up to 75 parts, by weight, of a polyvinyl halide latex such as a polyvinyl chloride latex. These polyvinyl halide latices can be prepared by homopolymerizing a vinyl halide or by copolymerizing it with another compatible and copolymerizable monomer in an emulsion or latex emulsion system. The term vinyl halide is deemed to be of sufficient scope to encompass the vinylidene halides as well which can be used as homopolymers or copolymers with one or more compatible monomers copolymerizable therewith in an emulsion or latex polymerization system. Among the vinyl halides which may be used to form this polyvinyl halide latex are vinyl chloride, vinyl fluoride, vinyl bromide, vinyl iodide, vinylidene chloride, vinylidene fluoride, vinylidene bromide, vinylidene iodide, and the like. Among the polymerizable monomers which may be used to form copolymers, terpolymers, and the like with the vinyl halides are such polymerizable monomers as styrene, the ring-substituted halo and alkyl substituted styrenes such as o-, m-, p-chloro styrene, o- m-, p-bromo styrene, and the like or the 2,4-dichloro styrene, 2,5-dichloro styrene, 3,4-dibromo styrene and the like. Additionally, one could use the o-, m-, p-ethyl styrene and the like or the 2,4-dimethyl styrene, the 2,5-diethyl styrene, and the like. One may use additionally such polymerizable monomers as acrylic acid, methacrylic acid and their esters such as the methyl, ethyl, isopropyl, butyl methacrylates and ethacrylates. It is ordinarily desired that there be used a preponderant amount of the vinyl halide in the copolymer such as about 75 parts of the vinyl halide and, correspondingly, about 25 parts of the corresponding copolymerizable monomers. A particularly useful polyvinyl halide copolymer latex is one prepared by emulsifying 95 parts of vinyl chloride with 5 parts of ethyl acrylate, which copolymer contains no conventional nonpolymeric plasticizers. This vinyl latex may be present in an amount varying between 0% and 75%, whereas the nitrile rubber latex may be present correspondingly in an amount varying between 100% and 25%, by weight, based on the total weight of solids constituents in the latex. It is preferred to use in the blend from about 40% to about 60%, by weight, of the vinyl latex and, correspondingly, from about 60% to about 40%, by weight, of the nitrile rubber latex, same basis as before. It will be apparent that when percentages by weight in the blend are given in corresponding terms, it is obvious that the total amount of the separate components are additively 100%. The filler paper used in the base member will be a conventional type of absorbant filler paper, of which a plurality are available commercially such as the unbleached creped kraft paper (Mosinee R–3–B), having an apparent density of 0.327 g./cc. The base paper is treated with the nitrile rubber or resin blend using typical paper saturating techniques to a resin pick-up within the range of from about 45 to about 75%, by weight, based on the total weight of the impregnated, dried paper and, preferably, between about 50% and 68%, by weight, of the resin solids based on the total weight of the impregnated dried paper. The base paper thus treated and dried provides a stable, tack-free sheet.

In producing the decorative laminates of the present invention, a variety of press cycles may be used such as by varying the pressure between about 200 and 1400 p.s.i. with temperatures between about 135° C. and 260° C. and press times from about five seconds to about thirty minutes. Ordinarily, the time factor diminishes as the temperatures and pressures are increased and vice-versa. If a fully flexible laminate is desired, the core sheets should be eliminated altogether or kept to a minimum such as between about 1 and 4 core sheets as hereinabove defined or sheets similar to the base sheet hereinabove defined. Laminates prepared by increasing the number of core sheets from 1 to 4 all gave satisfactory products but with slightly increased stiffness with the increased number of core sheets. If flexibility of the laminate is less important than rigidity, a plurality of core sheets even in excess of 4 can be used up to about 8 or 9, but beyond that, nothing of significance is to be gained by increasing the total number of core sheets.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE I

A laminate stack is assembled preparatory to insertion in a laminate press comprising the following laminae in the order recited. A 2 mil thick transparent rigid unplasticized polyvinyl chloride film is positioned over an α-cellulose decorative sheet of 65 lbs. basis weight treated to a resin level of 39% solids with a polyblend of 75 parts of an acrylic emulsion prepared by copolymerizing about 98 parts of ethyl acrylate with 2 parts of acrylic acid in a conventional emulsion polymerization system and 25 parts of a commercially available thermosetting melamine-formaldehyde impregnating resin which sheet is positioned over a filler sheet of 31 lbs. basis weight of unbleached, absorbant creped kraft paper treated to a resin level of 50% with a polyblend resin of 55 parts of a polyvinyl chloride latex and 45 parts of an acrylonitrile-butadiene rubber latex (35/65 A:B, respectively). This assembly is then prepared for insertion into a laminating press. Onto the unplasticized polyvinyl chloride film there is placed a stainless steel press plate. On top of the press plate there is positioned a 10 mil film of a polypropylene stress relief sheet. On top of the polypropylene stress relief sheet, there may be positioned optionally a separator release sheet and on top of the release sheet there is positioned a plurality of cushion sheets which are kraft paper unimpregnated with any resinous material. This entire assembly is then introduced into the press and the press is closed and the assembly is subjected to a maximum temperature of about 146° C., 1400 p.s.i. pressure for 15 minutes in a veneer pack in a flat bed press. After curing, and while the pressure is maintained, the total assembly is cooled to about 40° C. or lower and then the pressure is released. A plurality of these laminates were pressed simultaneously in the press and were separated from one another with suitable release sheets. Upon removing the assembly from the press, the polypropylene film is removed. The surface of the laminate is inspected for blistering and delamination and no defects are to be found.

COMPARATIVE EXAMPLE II

Example I is repeated in all essential details except that the polypropylene film is not inserted between the cushion and the outside stainless steel press plate. When the laminate is removed from the press, blistering of the vinyl surface occurs and it effects the outermost 4 to 6 laminates in each set of laminates produced between the two press plates.

The theory of using a thermoplastic film to form a shock absorbing layer for the stress forces exerted during the rapid cooling portion of the cure cycle were postulated and then demonstrated to be feasible and practical. Furthermore, it was demonstrated that the isolation of the major cause of shear stress resulting from temperature changes, i.e. the press platen from the complete stack of laminates gave protection from these stresses to the complete pack. Thus, two stress sheets can reduce the stress build-up in 16 laminates. The concept of the present invention permits the economical production of large size thermosetting type laminates having a thermoplastic surface. A wide range of surfacing applications exist for products of this type.

The degree of delamination of this type of thermoplastic sheet surface thermosetting laminate appears to be related in some measure to the thickness of the laminates and the composition of the rest of the laminate besides the thermoplastic surface layer. This relationship should be explored to determine its applicability to handling laminates where the surface layer is markedly different in thermal expansion properties from the rest of the laminate.

EXAMPLE III

Example I is repeated in all essential details except the transparent polyvinyl chloride film and the decorative sheet are removed and replaced by a 2 mil thick rigid unplasticized polyvinyl chloride film which has been back printed with a wood grain design. The results are the same.

Reference is made to the accompanying drawing in which 10 are steel press platens. (The items 12 are pan irons commonly used to hold material in place during loading and unloading of the press.) The items 14 are a plurality of kraft paper sheets, which have not been impregnated with any resinous material and that function as a cushion to prevent any damage to the laminate during the pressing cycle. The items 16 are separator release sheets of common use in the trade, such as a glassine paper, aluminum foil with or without a paper backing, parchment papers, and the like. The items 18 are polypropylene film used as a stress release sheet. The items 20 are the stainless steel press plates. The items 22 are optional smoothing or texturing sheets. The items 24 are the laminating assembly as described hereinabove in Example I and is made up of the transparent thermoplastic film such as unplasticized film of polyvinyl chloride, a decorative sheet impregnated with a noble thermosetting resin and at least one core sheet impregnated with a thermosetting resin.

Only two laminate assemblies are shown in the drawing but by repeating the assemblies between additional press plates, many laminates can be pressed at one time. There is always the need for the polypropylene stress relief sheet under the bottom most press plate and above the top most press plate only.

We claim:
1. A process for producing a decorative laminate comprising preparing an assembly of at least one core sheet impregnated with a thermosetting resin, a decorative sheet impregnated with a noble thermosetting resin, a thin transparent thermoplastic film positioned on said decorative sheet, in which there is placed on the decorative sheet side of the laminate assembly a steel press plate onto which is placed a removable 5 to 25 mil film of polypropylene as a stress relief sheet onto which is positioned a plurality of cushion sheets and the assembly is heat and pressure consolidated to a unitary structure.

2. The process according to claim 1 in which the polypropylene film is 10 mils thick.

3. The process according to claim 1 in which the core sheet is a dried paper based sheet impregnated with from about 45% to about 75% by weight based on the total weight of the impregnated dried paper of a nitrile rubber composition containing from about 25% to 100% of nitrile rubber latex and correspondingly from about 75% to 0% by weight of a polyvinyl halide latex.

4. The process according to claim 1 in which the decorative sheet is a dried decorative paper impregnated with from about 30% to about 50% by weight based on the total weight of the impregnated dried paper of an acrylic polymer composition derived from an acrylic polymer emulsion containing from about 25% to about 50% solids of from about 25% to 100% of an acrylic polymer and correspondingly from about 75% to 0% by weight of a water dispersible thermosetting melamine-formaldehyde resin.

5. The process according to claim 3 in which the decorative sheet is a dried decorative paper impregnated with from about 30% to about 50% by weight based on the total weight of the impregnated dried paper of an acrylic polymer composition derived from an acrylic polymer emulsion containing from about 25% to about 50% solids of from about 25% to 100% of an acrylic polymer and correspondingly from about 75% to 0% by weight of a water dispersible thermosetting melamine-formaldehyde resin.

6. The process according to claim 5 in which the polypropylene film is 10 mils thick.

7. The process according to claim 3 in which the nitrile rubber composition is comprised of a blend of at least 25% by weight of said nitrile rubber latex and correspondingly not more than 75% of a polyvinyl halide latex.

8. The process according to claim 3 in which the nitrile rubber composition is comprised of a blend of about 40–60% by weight, of said nitrile rubber latex and correspondingly from about 60%–40% of a polyvinyl halide latex.

9. The process according to claim 8 in which the decorative sheet is impregnated with a blend of about 50%–80% by weight of an acrylic emulsion and correspondingly from about 50% to about 20%, by weight, of a thermosetting melamine-formaldehyde resin.

10. The process according to claim 9 in which the polypropylene film is 10 mils thick.

References Cited

UNITED STATES PATENTS

| | | | |
|---|---|---|---|
| 3,418,189 | 12/1968 | Grosheim | 156—277 |
| 2,930,727 | 3/1960 | Baranyi | 161—248 X |
| 1,923,070 | 8/1933 | Belknap | 161—413 X |
| 3,547,769 | 12/1970 | Albrinck et al. | 161—248 |

RICHARD D. LOVERING, Primary Examiner

U.S. Cl. X.R.

156—61, 288; 161—248, 413